Oct. 27, 1970   R. W. HUGHES   3,535,843
SHEET METAL SEAM STRUCTURE
Filed May 23, 1968   2 Sheets-Sheet 1

INVENTOR.
ROYAL W. HUGHES
BY M. A. Hobbs
ATTORNEY

3,535,843
SHEET METAL SEAM STRUCTURE
Royal W. Hughes, 1 St. Joseph Manor,
Elkhart, Ind. 46514
Filed May 23, 1968, Ser. No. 731,477
Int. Cl. E04d *1/36;* F16b *5/02*
U.S. Cl. 52—394                                     5 Claims

ABSTRACT OF THE DISCLOSURE

A fabricated sheet metal material consisting of a series of parallel sections joined together by a joint formed by overlapping margins of adjacent sheets, with the two margins joined together by a plurality of bolts or screws spaced along the margins. Each of the margins has an inturned flange defining a space between the margins, and a sealing compound is disposed in the space.

---

In trailer and mobile home construction, the roof and sides are frequently covered with sheet aluminum or steel which may extend the full length of the structure. The roof is often eight, ten or twelve feet wide and the side walls eight feet high, with the trailer or mobile home ranging in length up to sixty feet or more. For covering these large areas it is impractical, if not impossible, to use single unjointed sheet material from the rolling mill; consequently, to provide sheet material of the required expanse, the material is normally fabricated from sections of rolled sheet metal ranging from about twenty to thirty-six inches in width and joined together in side-by-side relation by water tight joints, these sections normally lying crosswise of the final sheet which is handled and applied to the vehicle structure as a single sheet. Often in handling the fabricated sheets and during the use of the trailer or mobile home, one or more sections of the sheet will become dented, ripped, scuffed or otherwise damaged. In the past, repairing such damaged material was not only difficult and expensive, but the joints between the new material and the old material were not the same as the original joints, and consequently the repaired material could readily be recognized. Further, the damaged sections were difficult to separate from the remainder of the sheet at the joints, and the new sections were difficult to attach to the old sections with a firm, watertight joint. It is therefore one of the principal objects of the present invention to provide a sheet metal joint or seam structure which forms a watertight seal between two sections of sheet metal, and which can easily be disassembled and assembled to replace damaged sections with new sections and to form watertight joints therewith.

Another object of the invention is to provide a relatively simple, easily formed sheet metal joint which will withstand long continued normal use and abuse without developing leaks or otherwise becoming defective, and which permits the damaged sections to be removed and new sections inserted without the use of any special tools or equipment.

A further object of the invention is to provide sheet metal material constructed of a series of sections joined together by joints which do not have interlocking flanges or other structural features requiring bending or distortion of the sheet metal edges or shifting of sections laterally, in order to separate sections and to connect adjacent sections in sealed relationship.

Additional objects and advantages of the invention will become apparent from the following description and accompanying drawings, wherein.

Figure 1:
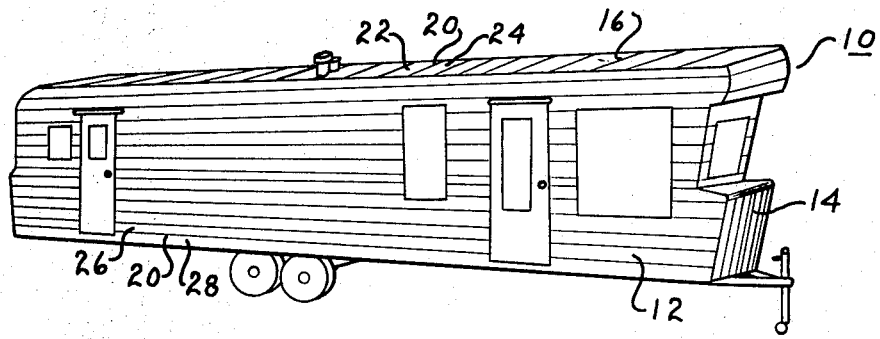
FIG. 1 is a perspective view of a mobile home illustrating the manner in which the present structure is used.
Figure 2:
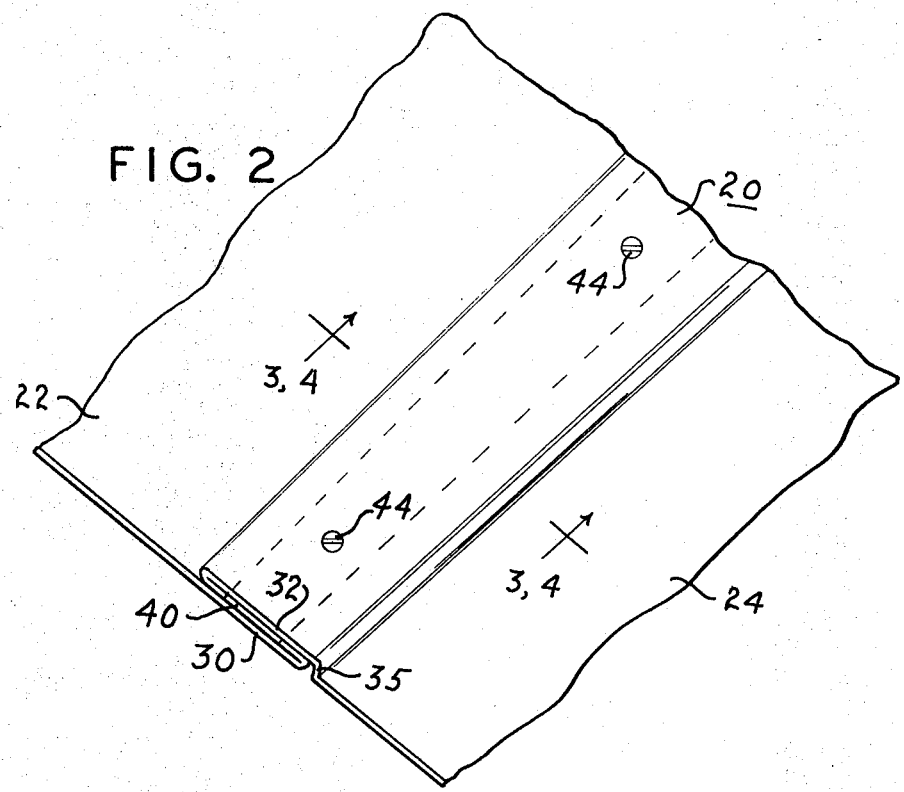
FIG. 2 is an enlarged fragmentary perspective view of a portion of the sheet metal used to cover the mobile home shown in FIG. 1.

Referring more specifically to the drawings and to FIG. 1 in particular, numeral 10 designates generally a mobile home having side and front walls 12 and 14 and a roof 16, all of which are covered by sheet metal embodying the present invention. The seams 20 between adjacent sections 22 and 24 are emphasized in the drawing in order to more clearly show the manner in which the joint structure is used; however, in the normal use of the material, the joints are less conspicuous and often are blended in with fluting, ribs or other design configurations formed in the metal sections. Sections such as 22 and 24, when joined together, form a continuous sheet from one end of the vehicle to the other, or of any desired intermediate length. As shown on side 12 and front end 14, the sections 26 and 28 joined by seams 20 are arranged horizontally and vertically, respectively. The sections may be in either position or in a combination of those two positions on the sides and ends of the vehicle.

The sheet metal sections are normally rolled aluminum or steel stock delivered to the fabricator in large rolls, and are cut into sections of a length corresponding approximately to the width of the roof or the height of the side or end walls. The material would normally be about 14 to 28 gauge, and the external surface is frequently covered with a lacquer or paint; however, the aluminum may be in its normal metallic condition and the steel may be galvanized.

Figure 3:
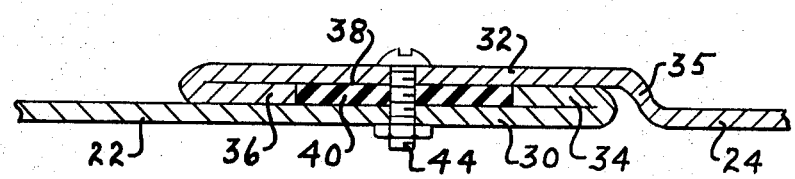
FIG. 3 is an enlarged cross-sectional view of the seam or joint shown in the preceding figures, the section being taken on line 3—3 of FIG. 2.
Figure 4:
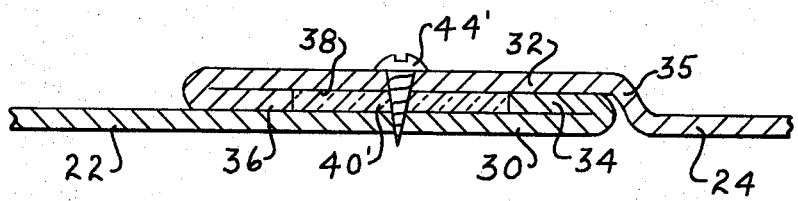
FIG. 4 is an enlarged cross-sectional view of the seam or joint shown in the preceding figures, the section being taken on line 4—4 of FIG. 2, illustrating a modification of the structure.

The present joint, which is best shown in FIGS. 3 and 4, consists of overlapping margins 30 and 32 on sections adjacent 22 and 24, each section having margin 30 along one edge and margin 32 along the opposite edge. The two margins have inturned flanges 34 and 36, respectively, which are pressed into face-to-face contact with the adjacent inner surface of the respective margin at the time the margins are formed into their final shape, as shown in the drawings, at the time they are fabricated, so that no bending or reshaping of the joint or seam is required when the sections are joined to one another.

Flange 30 is parallel with the principal portion of the sheet section, whereas flange 32 is offset from the main portion of the sheet section by an amount equal to the thickness of the sheet and margin 30; thus the two sections 22 and 24 are on the same plane with one another with the joint projecting outwardly therefrom. The offset of the margin is obtained by the S-shaped bend 35.

In connecting two sections, margins 30 and 32 are placed in overlapping relationship in the manner illustrated in FIGS. 3 and 4 with the inner ends of flanges 34 and 36 in spaced relation to one another. The spacing of the two inner edges of the two flanges provides a space 38 in which a sealing compound 40, such as rubber, plastic or the like, is inserted. The sealing material 40 may be of a variety of different types of sealing compounds, including uncured rubber, putty, and various types of resilient rubber or plastic materials, which can be compressed when the two margins are placed together in position as shown in the drawings. With the two margins assembled in the position shown in FIGS. 3 and 4 and with the sealing compound in space 38, the margins are joined together by bolts or screws 44 or other suitable types of securing means.

The bolts or screws may be spaced every six inches, for example, or closer or further apart, depending on the application of the final sheet material. For example, roofing material would normally have the securing means 44 closer together, whereas wall material, in which the sections are used in vertical position, would normally have the securing means spaced further apart. Rivets may be used as the securing means; however, some difficulty may be encountered in removing them in the event one of the sections on either side of the joint requires replacement. When the two margins are secured firmly together by bolts or screws 44, the sealing material is preferably compressed and firmly seated on the inner surfaces of the two margins and on the ends of flanges 34 and 36. When the material is of a pliable character, the sealing material may ooze between the inner surfaces of the margin and the adjacent surface of the flange on the opposite margin.

In the embodiment shown in FIG. 3, rubber or rubber-like material is inserted in space 38 as a precut strip, and is compressed therein in very much the same way as a gasket, when bolts or screws 44 are tightened, drawing the two margins together. In FIG. 4, the material is shown as a pliable plastic material 40', including uncured rubber or putty, and the two margins are secured by a sheet metal screw 44' or the like. The structure of the joints shown in FIG. 4 is otherwise the same as the joint shown in FIG. 3.

If a section, for example section 22, is damaged after the present material has been applied to a mobile home structure, it can readily be replaced by removing bolts 44 or screws 44' from the opposite edges of the damaged section, and then merely slipping or lifting the section from the two adjacent sections. A new section can easily be inserted in place of the original section and secured therein by inserting the bolts or screws. If the calking compound or sealing material has been damaged or removed during the disassembling operation, new material will be required, and after the joint has been reassembled, it forms a watertight seal between the two sections in the same manner as the original section.

While only one embodiment and several modifications of the present roofing material have been described in detail herein, various changes and modifications may be made without departing from the scope of the invention.

I claim:

1. A seam for joining two sections of sheet metal together in side-by-side relation, comprising a margin on one sheet extending outwardly therefrom on a plane parallel to but different from the plane of said sheet and having an inturned flange overlapping the inner surface of said margin, a margin on the other sheet extending outwardly therefrom on the same plane as said sheet and having an inturned flange overlapping the outer surface of said second mentioned margin, the flange of the margin of each sheet being joined to the outermost edge of the respective sheet, said margins overlapping one another with the flange on said first mentioned margin contacting the outer surface of said second mentioned margin and with the flange on said second mentioned margin contacting the inner surface of said first mentioned margin, said flanges being on the same plane and spaced laterally from one another to provide an enclosed space therebetween, a sealing material disposed in said space and contacting the inner surfaces of said margins, and a plurality of removable means spaced along said margins and extending through and securing said margins together.

2. A seam for joining two sections of sheet metal together as defined in claim 1 in which said plurality of means spaced along the margins consists of bolts extending through aligned holes in the two margins.

3. A seam for joining two sections of sheet metal together as defined in claim 1 in which said plurality of means spaced along said margins consists of screws.

4. A seam for joining two sections of sheet metal together as defined in claim 1 in which said sealing material disposed in said space is fluid in character.

5. A seam for joining two sections of sheet metal together as defined in claim 1 in which said sealing material disposed in said space is compressible and resilient.

References Cited

UNITED STATES PATENTS

| | | | |
|---|---|---|---|
| 1,479,201 | 1/1924 | Naylor. | |
| 1,582,266 | 4/1926 | Harshberger | 52—553 X |
| 2,228,779 | 1/1941 | Pavlecka et al. | 52—394 |
| 2,293,569 | 8/1942 | Sonino | 52—403 X |
| 2,602,408 | 7/1952 | Smith-Johannsen | 52—394 X |
| 3,042,157 | 7/1962 | Dorfman | 52—403 |
| 3,151,767 | 10/1964 | Nakata. | |

FRANK L. ABBOTT, Primary Examiner

S. D. BURKE III, Assistant Examiner

U.S. Cl. X.R.

52—403, 553; 287—189.36